US006864432B2

(12) United States Patent
Boettcher et al.

(10) Patent No.: US 6,864,432 B2
(45) Date of Patent: Mar. 8, 2005

(54) ELECTRICAL INSULATORS, MATERIALS AND EQUIPMENT

(75) Inventors: Bodo Boettcher, Bayreuth (DE); Ralf Lietzke, Anzing (DE); Gerold Malin, Kaltenleutgeben (AT); Robert Paul Glembocki, Holly Springs, NC (US); Matthew Helm Spalding, Fuquay Varina, NC (US)

(73) Assignee: Tyco Electronics Raychem GmbH (DE)

( * ) Notice: Subject to any disclaimer, the term of this patent is extended or adjusted under 35 U.S.C. 154(b) by 0 days.

(21) Appl. No.: 10/470,440

(22) PCT Filed: Feb. 8, 2002

(86) PCT No.: PCT/GB02/00574

§ 371 (c)(1),
(2), (4) Date: Jul. 28, 2003

(87) PCT Pub. No.: WO02/065486

PCT Pub. Date: Aug. 22, 2002

(65) Prior Publication Data

US 2004/0129449 A1 Jul. 8, 2004

(30) Foreign Application Priority Data

Feb. 9, 2001 (GB) ............................................ 0103255

(51) Int. Cl.[7] ............................................ H02G 15/068

(52) U.S. Cl. .............................. 174/138 F; 174/137 R; 174/73.1; 174/73 R; 174/179

(58) Field of Search ........................ 174/138 F, 137 R, 174/73.1, 73 R, 179, 80, 209, 212

(56) References Cited

U.S. PATENT DOCUMENTS

| | | | | | |
|---|---|---|---|---|---|
| 3,658,583 | A | | 4/1972 | Ogawa et al. | 117/201 |
| 3,791,859 | A | | 2/1974 | Hirayama | 117/201 |
| 4,563,544 | A | | 1/1986 | Bui et al. | 174/140 |
| 4,714,800 | A | * | 12/1987 | Atkins et al. | 174/73.1 |
| 5,294,374 | A | * | 3/1994 | Martinez et al. | 252/516 |
| 6,124,549 | A | * | 9/2000 | Kemp et al. | 174/73.1 |

FOREIGN PATENT DOCUMENTS

| | | |
|---|---|---|
| FR | 2 547 451 | 12/1984 |
| JP | 07312131 | 11/1995 |
| WO | 97/26693 | 7/1997 |

* cited by examiner

*Primary Examiner*—Dean A. Reichard
*Assistant Examiner*—Jinhee Lee
(74) *Attorney, Agent, or Firm*—Myers Bigel Sibley & Sajovec

(57) ABSTRACT

An elongate high voltage insulator is formed of a rod or tube of insulating material, with a pair of electrodes spaced apart longitudinally thereof. At least part, and preferably the whole of the outer surface of the insulating material is covered by a layer of material including a particulate filler of varistor powder in a matrix having a switching electrical stress-controlling characteristic that is in electrical contact with each of the electrodes. The insulator core may be made of porcelain, and the stress-controlling material may be zinc oxide.

38 Claims, 3 Drawing Sheets

ELECTRICAL INSULATORS, MATERIALS AND EQUIPMENT

RELATED APPLICATIONS

The present application is a National Phase application of PCT/GB02/00574 filed on Feb. 8, 2002 and published in English, which claims priority from Application GB 0103255.6 filed on Feb. 9, 2001.

FIELD OF THE INVENTION

This invention relates to electrical insulators, material, and equipment, for example an elongated high votage insulator.

BACKGROUND OF THE INVENTION

An insulator typically comprises an insulating core that extends between two electrodes which, in operation, are maintained at significantly different electrical potentials, one of which may be earth. The insulating core may comprise a tube or a rod, which may be made of a ceramic material or of glass fiber reinforced plastics material, for example. Typically in an electrical distribution system, one end of the insulator is maintained at earth potential, and the other end is at the potential of the system, which may be 10 kV or above, for example the 375 kV electricity distribution system of the UK. At high voltages, the insulator serves to isolate the system from earth, and the higher the operating voltage of the system, the longer the insulator has to be in order to maintain the isolation. The electrical stress between the insulator electrodes results in leakage current flowing over the surface of the insulating material from high voltage to ground, and thus leads to a constant loss of power from the operating system.

SUMMARY OF THE INVENTION

It is an object of the present invention to provide an improved insulator.

In accordance with one aspect of the present invention, there is provided a high voltage free-standing insulator comprising an elongate tube or rod of electrically insulating material having a pair of electrodes spaced apart longitudinally thereof, and a layer of material comprising a particulate filler of varistor powder in a matrix having a switching electrical stress-controlling characteristic, wherein the stress-controlling material extends over part or substantially all of the outer surface of the insulating material and in electrical contact with each of the electrodes.

By the term "free standing", it is meant that the insulator may form an insulator per se, that is to say without there being an electrical conductor extending therethorough, or it may be disposed around, that is to say not formed in situ onto, supporting electrical equipment that may itself contain an electrical conductor.

Advantageously, the varistor material is inorganic, for example a ceramic or a metal oxide, and preferably comprises zinc oxide.

Although the stress-controlling material may lie directly in contact with the insulating material, it is also envisaged that it may be spaced therefrom, for example by another layer of material. The other, intermediate, layer of material may be a stress-controlling material having a different voltage/current characteristic from the zinc oxide varistor material, for example a linear characteristic (c=1, see below).

It is thus seen that in addition to the conventional electrically insulating tube or rod, the insulator of the present invention is provided with an outer layer of stress-controlling material, preferably in the form of particulate zinc oxide varistor powder in a matrix, this material having a switching electrical stress-controlling characteristic. This material distributes the electrical stress along the outer surface of the insulator when operating at high voltage. Upon application of an excessively high voltage to one of the electrodes, for example arising from a lightning strike, the material substantially instantaneously switches to a conductive mode, whereby the electrical power is safely dissipated to earth. The material then amicrometresost immediately reverts to its insulating mode.

Such a non-linear material obeys a generalised form of Ohms Law: $1=kV^c$, where c is a constant greater than 1, whose value depends on the material under consideration.

Such a stress controlling characteristic is not only non-linear in respect of the variation of its a.c. electrical impedance, but also exhibits a switching behaviour, in that the graph of voltage applied to the material versus current flowing therealong shows an abrupt transition, whereby below a predetermined electrical stress, dependent on the particular material, the stress-controlling material exhibits insulating behaviour substantially preventing the flow of any current, but when that electrical stress is exceeded, the impedance of the material drops substantially to zero in a very short time so that the triggering high voltage on the one terminal can be conducted to the other terminal, usually at earth potential.

The insulator of the present invention is particularly suitable for forming an insulator per se, whether it be a tension, suspension, cantilever, compression or torsional electrical insulator. However, the insulator, with the electrically insulating material in the form of a tube, is also suitable for being disposed around electrical equipment, such as the termination of a high voltage cable, around a bushing, a switch, or a disconnector, for example. Such electrical equipment may be susceptible to flashover as a result of contamination on the outer surface, especially in combination with moisture which can lead to the formation of dry bands with consequential flashover, tracking and erosion, which can in extreme cases destroy the insulating material and bring about failure of the insulating function. Sparking also produces electromagnetic interference. Also, flashover can result from the combination of high field stress along the outer insulating surface of a cable termination arising from electrically stresses within the termination in combination with the voltage stress across dry bands. Conventionally, such flashovers are minimised by increasing the length of the insulator, and/or the thickness of the insulating material, which has the undesirable effect of increasing the overall physical size of the arrangement. In accordance with the present invention, however, the stress-control material applied to the outside of the insulator limits the electrical field strength on that insulating surface, which surface may otherwise be the transition between insulating material and air.

In the application to a high voltage cable termination, the insulator may be disposed around the cut back of the conductive screen of the cable, being a high stress region. The application of the switching varistor material allows a smaller diameter construction to be achieved, whilst maintaining the desired electric strength axially of the insulator.

The varistor, electrical stress grading material may be disposed over the entire length of the underlying insulating material, or alternatively only partially thereover. In the latter case, the stress control material may be located in the regions 8', 8" of relatively high electrical field strength near the electrodes and extending along the insulation away therefrom.

Furthermore, a capacitive stress grading effect may be achieved by alternating bands of the stress control material with exposed underlying bands of the insulating material.

An insulator in accordance with the present invention would be expected to be subject to less electrical activity, corona discharging, arcing, and material deterioration, and to exhibit better flashover resistance than a conventional insulator, particularly in ambient conditions of high humidity and/or contamination.

The stress-controlling layer used in the invention may comprise the outermost layer of the insulator. Alternatively, the stress-controlling material may itself be enclosed within an outer layer that provides electrical and/or environmental protection for the insulator.

Provided that the substrate, insulating, material is of sufficiently low thermal capacity and of sufficiently high thermal conductivity, it will conduct heat away relatively quickly from the varistor material, so that an outer protective covering may not be required. A ceramic, for example porcelain, substrate would be suitable in this respect. However, if the underlying insulating material were, for example, a silicone polymeric material, then in adverse environmental conditions, for example wet conditions, the amount of leakage current may be high enough to degrade the varistor layer, requiring a protective external covering to be applied to the insulator.

The outermost component of the insulator is preferably provided with one or more sheds, that is to say substantially disc-like configurations that direct moisture and water and other contaminants off the surface of the insulator so as to interrupt a continuous flow thereof from one electrode to the other, thus avoiding short-circuiting.

Preferably, the particles of the filler of the layer of stress controlling material are calcined at a temperature between 800° C. and 1400° C., and subsequently broken up such that substantially all of the particles retain their original, preferably substantially spherical shape.

The calcination process is believed to result in the individual particles effectively exhibiting a "varistor effect". That is to say the particulate material is not only non-linear in respect of the variation of its a.c. electrical impedance characteristic (the relationship between the a.c. voltage applied to the material and the resultant current flowing therethrough), but it also exhibits a switching behaviour, in that the graph of voltage versus current shows an abrupt transition, which is quantified by the statement that the specific impedance of the material decreased by at least fact of 10 when the electric field is increased by less than 5 kV/cm (at some region within an electric field range of 5 kV/cm to 50 kV/cm, and preferably between 10 kV/cm and 25 kV/cm, —being a typical operating range of the material when used in the termination of an electric power cable) preferably, the transition is such that the specified decrease takes place when the electric field is increased by less than 2 kV/cm within the range between 10 and 20 kV/cm. The non-linearity occurs in both the impedance of the material and also in its volume resistivity. The non-linearity of the filler particles may be different on each side of the switching point. It is also important that at the switching point the material simply significantly changes its non-linearity, and does not lead to electrical breakdown or flashover as the electrical stress is increased. The smaller the particle size for any given composition, the less is the likelihood of breakdown occurring beyond the switching point.

Preferably at least 65% of the weight of the filler comprises zinc oxide.

Preferably more than 50% by weight of the filler particles have a maximum dimension of between 5 and 100 micrometers, such that the material exhibits non-linear electrical behaviour whereby its specific impedance decreased by at least a factor of 10 when the electric field is increased by less than 5 kV/cm at a region within an electrical field range of 5 kV/cm to 50 kV/cm.

Preferably the filler comprises between 5% and 60% of the volume of the stress-controlling material layer, advantageously between 10% and 40%, and most preferably between 30% and 33% of the volume.

In practice the particulate filler will comprise at least 65%, and preferably 70 to 75% by weight of zinc oxide. The remaining material, dopants, may comprise some or all of the following for example, as would be known to those skilled in the art of doped zinc oxide varistor materials: $Bi_2O_3$, $Cr_2O_3$, $Sb_2O_3$, $Co_2O_3$, $MnO_3$, $Al_2O_3$, CoO, $Co_3O_4$, MnO, $MnO_2$, $SiO_2$, and trace amounts of lead, iron, boron, and aluminium.

The polymeric matrix may comprise elastomeric materials, for example silicone or EPDM; thermoplastic polymers, for example polyethylene or polypropylene; adhesives for example those based on ethylene-vinyl-acetate; thermoplastic elastomers; thixotropic paints; gels, thermosetting materials, for example epoxy or polyurethane resins; or a combination of such materials, including co-polymers, for example a combination of polyisobutylene and amorphous polypropylene.

The stress-controlling material may be provided in the form of a glaze or paint, which may be applied, for example, to a ceramic insulator or other insulating substrate. Such stress-controlling glaze or paint, and electrical articles or equipment of all kinds (free-standing or not) to which such glaze or paint has been applied, are another aspect of the present invention.

According to a further aspect of the present invention, the particulate material hereindisclosed, preferably zinc oxide, is mixed in its fired, or preferably unfired, state into a slurry, which is then fired to form a glaze.

The slurry may, for example, comprise clay that upon firing produces porcelain or other ceramic. Alternatively, the matrix into which the particles are deposited may be inorganic, for example being a polymer, an adhesive, a mastic or a gel.

It will be appreciated that, in these forms of the invention, it may be the step of firing the slurry, glaze, or paint that produces the varistor switching characteristic required of the stress-controlling material, if that characteristic has not previously been imposed, or sufficiently imposed, on the particulate material.

The total composition of the stress-controlling material may also comprise other well-known additives for those materials, for example to improve their processibility and/or suitability for particular applications. In the latter respect, for example, materials for use as power cable accessories may need to withstand outdoor environmental conditions. Suitable additives may thus include processing agents, stabilizers, antioxidants and platicizers, for example oil.

The presence of the varistor material on the outer surface of the insulating material in the insulator of the present invention tends to result in leakage current flowing through the bulk of the material rather than along the surface when a dry band is formed, thus avoiding the problem of tracking. Furthermore, such stress grading material also allows the insulator to be made of lesser wall thickness and smaller diameter for good electrical performance in comparison with conventional insulators. Thus, with an insulator of the present invention, at comparatively low voltages, the leakage current will flow relatively harmlessly along its outer surface due to the comparatively low impedance of the varistor material. Should the voltage increase above a certain value, the varistor material will then switch over to its high impedance state and the leakage current will then pass through the body of the material without the formation of damaging carbonaceous tracks on its outer surface.

The stress-controlling material may be applied to the insulating material by extrusion, by moulding, or by being in the form of a separate component. In the last-mentioned construction of the insulator, the stress-controlling material is preferably in the form of a tube, and may advantageously, when the matrix comprises polymer, be recoverable, preferably heat-recoverable, into position. When the outer surface of the insulator is of shedded configuration, the sheds may be integrally formed, or they may be applied separately.

International patent application publication number WO 97/26693 discloses a composition for use as an electrical stress-controlling layer, and that composition is suitable for the stress-controlling layer of the insulator of the present invention. The entire contents of this published patent application are included herein by this reference.

BRIEF DESCRIPTION OF THE DRAWINGS

Two embodiments of insulator, each in accordance with the present invention, will now be described, by way of example, with reference to the accompanying drawings, in which.

DETAILED DESCRIPTION OF THE ILLUSTRATED EMBODIMENTS

Figure 1:
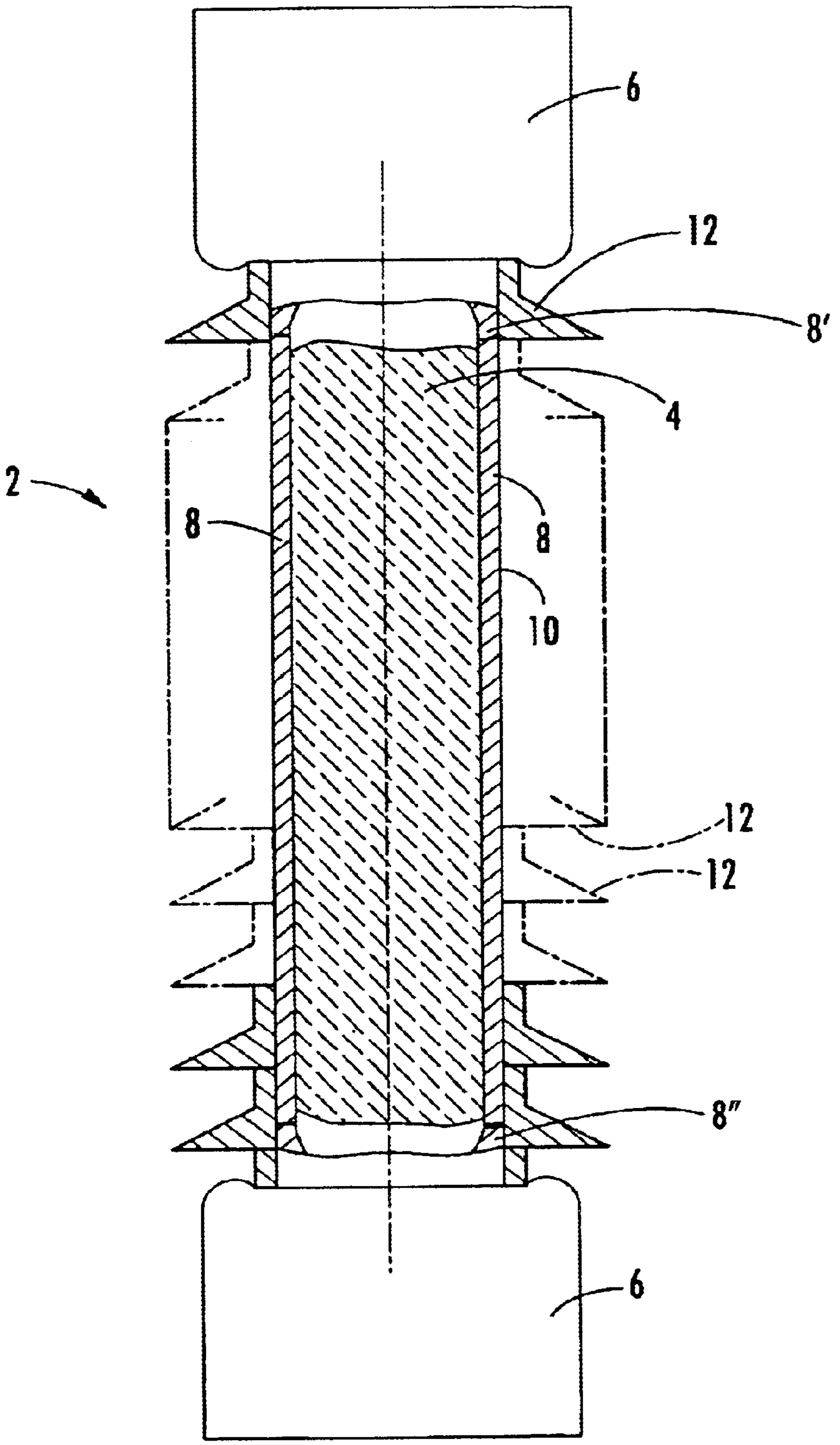
FIG. 1 shows a first embodiment in vertical section, in which a stress-controlling layer of a hollow tubular insulator is enclosed within an outer protection layer.

Referring to FIG. 1, an insulator 2 comprises a cylindrical tubular core 4 of ceramic material, having a brass electrode 6 mounted on each end thereof. A layer of doped zinc oxide varistor material 8 is moulded on to the entire outer surface of the insulating core 4 between the electrodes 6. An optional outer protection layer 10 is applied to cover the entire outer surface of the stress-controlling layer 8. The protection layer 10 is provided with a plurality of generally circular sheds 12 that project radially of the insulator 2. Core 4 may alternatively be a solid body.

Figure 2:
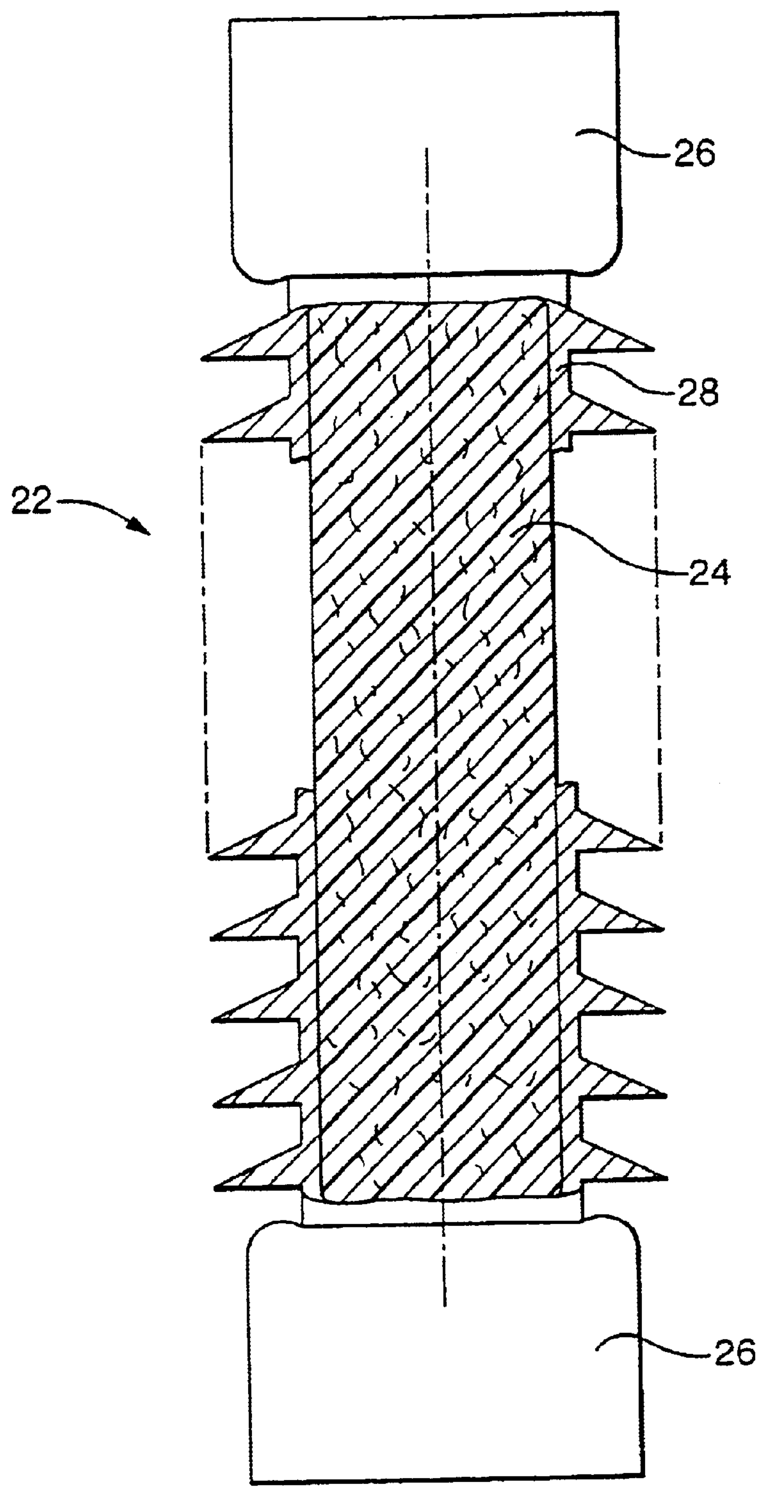
FIG. 2 shows a second embodiment in which the stress-controlling material is formed integrally with the outer protection layer of a solid core insulator.

Referring to FIG. 2, the insulator 22 comprises an inner cylindrical core 24 of fiber-reinforced epoxy resin extending between a pair of terminal electrodes 26. In this embodiment, however, a single, shedded outer component 28 is moulded onto the core 24. The component 28 is formed of a material that performs the function of controlling the stress on the outer surface of the insulator 24 as well as providing outer environmental protection therefor. The solid core 24 may alternatively be a hollow tubular construction.

The doped zinc oxide stress-control material that forms the layer 8 in the first embodiment (FIG. 1), and that is included in layer 28 of the second embodiment (FIG. 2) is a matrix of silicone elastomer and a particulate filler of doped zinc oxide.

The doped zinc oxide comprises approximately 70 to 75% by weight of zinc oxide and approximately 10% of $Bi_2O_3$+$Cr_2O_3$+$Sb_2O_3$+$Co_2O_3$+$MnO_3$.

The powder was calcined in a kiln at a temperature of about 1100° C., before being mixed with pellets of the polymer matrix and fed into an extruder to produce the final required form. The calcined filler comprised about 30% of the volume of the total composition comprising the filler and the polymeric matrix.

Figure 3:
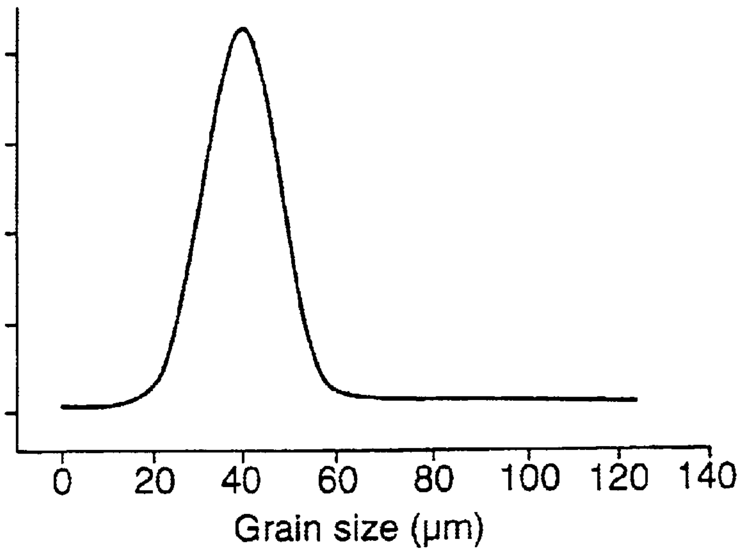
FIG. 3 is a graph of a typical particle size distribution of the calcined doped zinc oxide filler.

A typical particle size distribution of relative numbers of calcined doped zinc oxide particles of a suitable powder, after having been passed through a 125 micrometer sieve, is shown in FIG. 3, from which it can be seen that there is a sharp peak at a particle size of about 40 micrometers, with the large majority of particles being between 20 and 6 micrometers.

Figure 4:
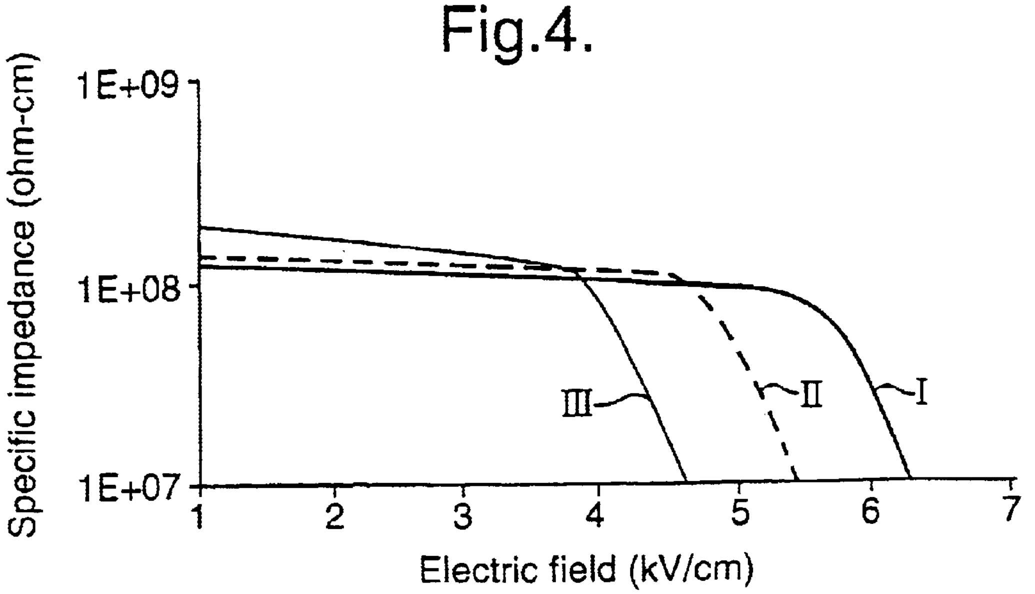
FIG. 4 is a graph of the impedance of the filler powder for various particle sizes.

The switching behaviour of the calcined doped zinc oxide particles, showing the abrupt change in non-linear specific impedance as a function of the electric field strength (at 50 Hz), is shown in FIG. 4 for three ranges of particle size. Curve I relates to a particle size of less than 25 micrometers, Curve II to a particle size of 25 micrometers to 32 micrometers and Curve III to a particle size of 75 micrometers to 125 micrometers. It is seen that the switching point occurs at higher electric field strength as the particle size is reduced.

It is envisaged that the inner insulating component corresponding to either core 4, 24 could be tubular, such that the insulator 2, 22 could be mounted on, for example, the termination of a high voltage cable so as to provide protection against flashover along the outer surface thereof. In this embodiment it is also envisaged that the termination of the cable itself would be stress-controlled, particularly at the cut-back of the cable screen, as is done conventionally.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A free-standing high voltage insulator comprising an elongate tube or rod of electrically insulating material having a pair of electrodes spaced apart longitudinally thereof, and a layer of stress-controlling material comprising a particulate filler of varistor powder in a matrix having a switching electrical stress-controlling characteristic, wherein the layer stress-controlling material extends over part or substantially all of the outer surface of the insulating material and at least some of the layer stress-controlling material is in contact with each of the electrodes.

2. An insulator according to claim 1, wherein the layer of stress-controlling material is present in two different regions near and in electrical contact with the respective electrodes.

3. An insulator according to claim 1, wherein the layer of stress-controlling material comprises inorganic material.

4. An insulator according to claim 1, wherein the layer of stress-controlling material is enclosed within an outer layer that provides at least one or electrical or environmental protection therefor.

5. An insulator according to claim 4 wherein the outer protection layer has a shedded configuration.

6. An insulator according to claim 1, wherein (i) the particles of the filler of the layer of stress controlling material are calcined at a temperature between 800° C. and 1400° C., and subsequently broken up such that substantially all of the particles retain their original shape, (ii) at least 65% of the weight of the filler comprises zinc oxide, (iii) more than 50% by weight of the filler particles have a maximum dimension of between 5 and 100 micrometers, such that the material exhibits non-linear electrical behavior whereby its specific impedance decreases by at least a factor of 10 when the electric field is increased by less than 5 kV/cm at a region within an electrical field range of 5 kV/cm to 50 kV/cm, and (iv) the filler comprises between 5% and 60% of the volume of the stress-controlling material layer.

7. An insulator according to claim 6, wherein all the particles of the filler have a maximum dimension of less than 125 micrometers.

8. An insulator according to claim 6, wherein not more than 15% by weight of the filler particles have a maximum dimension less than 15 micrometers.

9. An insulator according to claim 6, wherein the filler particle, are calcined at a temperature between 950° C. and 1250° C.

10. An insulator according to claim 6, wherein at least 70% of the weight of the filler comprises zinc oxide.

11. An insulator according to claim 6, wherein more than 50% by weight of the filler particles have a maximum dimension of between 25 and 75 micrometers.

12. An insulator according to claim 1, wherein the filler comprises between 10% and 40% of the volume of the stress-controlling material layer.

13. An insulator according to claim 12 wherein the filler comprises between 30% and 33% of the volume of the stress-controlling material layer.

14. An insulator according to claim 1 wherein the layer of stress-controlling material has a shedded outer configuration.

15. An insulator according to claim 1, wherein the layer of stress-controlling material is applied directly onto the layer of insulating material.

16. A high voltage bushing, switch, or disconnector, comprising an insulator according to claim 1.

17. A high voltage electric cable having a stress-controlled termination at one end thereof enclosed within an insulator according to claim 1.

18. An insulator according to claim 1, wherein the matrix of the stress-controlling material layer comprises at least one of a polymeric material, a resin, a thixotropic paint or a gel.

19. An insulator according to claim 18, wherein the polymeric material comprises at least one of polyethylene, silicone or EPDM.

20. An insulator according to claim 1 wherein the stress-controlling material comprises zinc oxide.

21. An electrical insulator having two displaced electrodes thereon and a switching electrical stress controlling material thereon comprising at least one of a slurry, glaze or paint, into which are dispersed particles with filler of varistor powder in a matrix configured to provide a stress grading characteristic, at least some of the stress controlling material being in contact with each of the electrodes.

22. The electrical insulator of claim 21, wherein the slurry forms a ceramic material.

23. The electrical insulator of claim 21, wherein the slurry comprises an inorganic matrix.

24. The electrical insulator of claim 21, wherein the slurry, glaze or paint has been fired so as to produce a material having an electrical stress-controlling switching characteristic.

25. The electrical insulator of claim 21, wherein the particles are not fired before being introduced into the slurry, gaze or paint.

26. The electrical insulator of claim 21 wherein the particles are included in a particulate filler and wherein at least 65% of the weight of the particulate filler comprises zinc oxide and wherein more than 50% by weight of the particulate filler comprises particles have a maximum dimension of between 5 and 100 micrometers, the stress controlling material having a specific impedance decrease of at least a factor of 10 when subjected to an electric field increase of less than 5 kV/cm at a region within an electrical field range of 5 kV/cm to 50 kV/cm, and wherein the particulate filler comprises between 5% and 60% of the volume of the stress controlling material.

27. A high voltage insulator comprising:

an elongate electrically insulating member;

a pair of longitudinally spaced electrode members coupled to the insulating member;

a stress-controlling material layer on an outer surface of the insulating member and electrically connected to and extending between the electrode members, the stress-controlling material layer comprising a particulate filler including varistor powder in a matrix and having a switching electrical stress-controlling characteristic, at least some of the stress-controlling material layer be in contact with each of the electrode members.

28. The insulator of claim 27 wherein the stress-controlling material layer further comprises a plurality of sheds.

29. The insulator of claim 27 further comprising an outer protection layer having a plurality of sheds.

30. The insulator of claim 27 wherein the stress-controlling material layer extends over substantially all of the outer surface of the insulating member.

31. The insulator of claim 27 wherein the stress-controlling material layer comprises zinc oxide in an elastomeric matrix.

32. The insulator of claim 27 wherein at least 65% of the weight of the particulate filler comprises zinc oxide and wherein more than 50% by weight of the particulate filler comprises particles have a maximum dimension of between 5 and 100 micrometers, the stress-controlling material layer having a specific impedance decrease of at least a factor of 10 when subjected to an electric field increase of less than 5 kV/cm at a region within an electrical field range of 5 kV/cm to 50 kV/cm, and wherein the particulate filler comprises between 5% and 60% of the volume of the stress-controlling material layer.

33. The insulator of claim 32 wherein more than 50% by Weight of the filler particles have a maximum dimension of between 25 and 75 micrometers.

34. The insulator of claim 32 wherein the filler comprises between 10% and 40% of the volume of the stress-controlling material layer.

35. The insulator of claim 32 wherein substantially all the particles of the particulate filler have a maximum dimension of less than 125 micrometers.

36. The insulator of claim 32 wherein not more than 15% by weight of the filler particles have a maximum dimension less than 15 micrometers.

37. The insulator of claim 32 wherein the filler particles are calcined at a temperature between 950° C. and 1250° C.

38. The insulator of claim 32 wherein at least 70% of the weight of the filler comprises zinc oxide.

* * * * *